March 3, 1970     J. C. JUREIT     3,498,171
CONNECTOR
Filed May 7, 1968
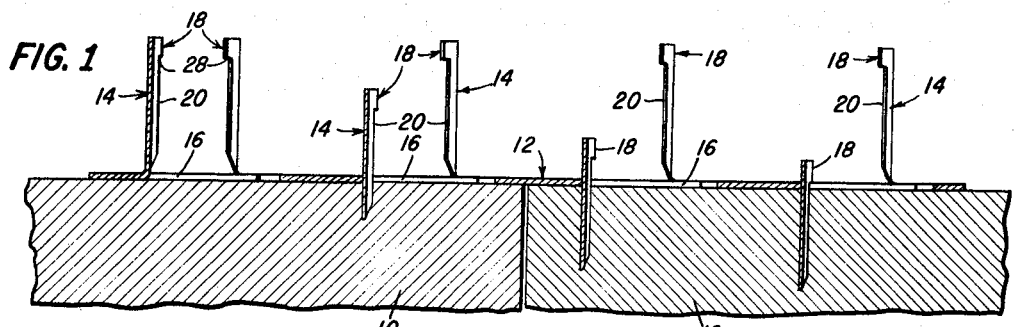
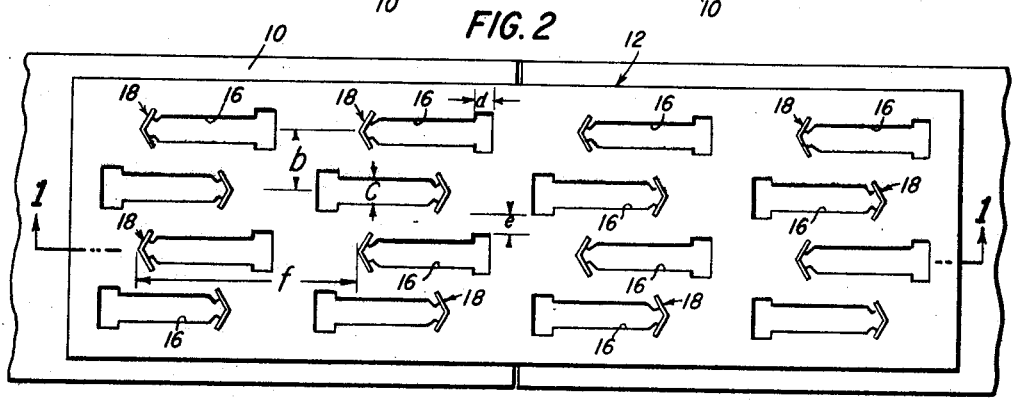
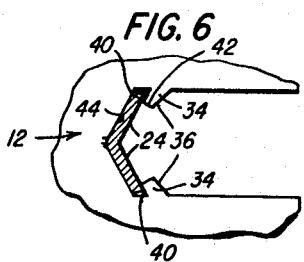
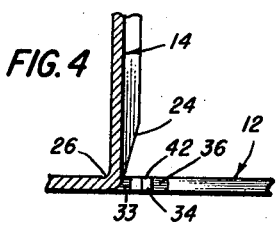
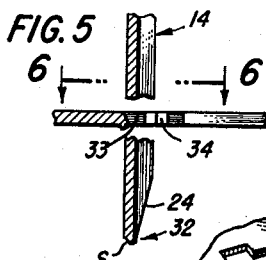
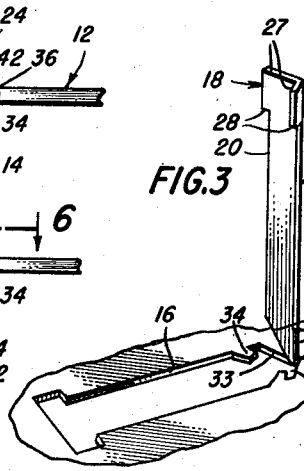
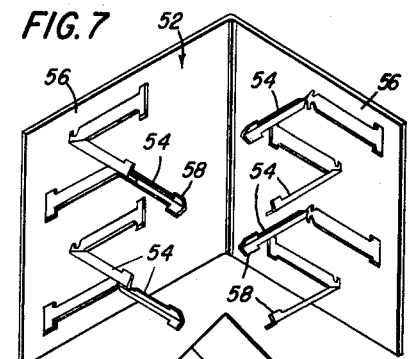
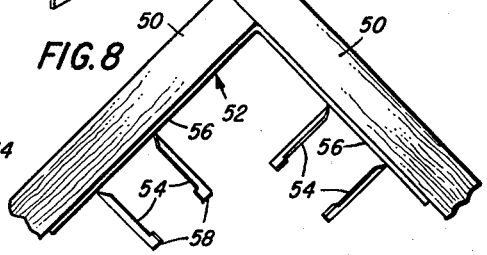
INVENTOR
JOHN C. JUREIT
BY Le Blanc & Shue
ATTORNEY United States Patent Office 3,498,171
Patented Mar. 3, 1970

3,498,171
CONNECTOR
John C. Jureit, Miami, Fla., assignor to Automated Building Components, Inc., Miami, Fla., a corporation of Florida
Filed May 7, 1968, Ser. No. 727,300
Int. Cl. F16b 15/00, 9/00
U.S. Cl. 85—13                                    23 Claims

ABSTRACT OF THE DISCLOSURE

The connector plate has a plurality of slender, elongated, nail-like teeth struck therefrom to project integrally from a side face thereof. The head portions of the teeth are spaced from the plate and a slender strip of metal connects the pointed end portion of each tooth with the plate providing the sole connection therebetween. In use, the opposite side face of the plate is applied against adjoining wooden members and each tooth is struck, as by a hammer, to sever the metal strip, thereby to drive the teeth through the associated slots left in the plate into the wooden members. Lugs are formed to project into the slots for guiding the teeth through the slots. The heads of the teeth are struck to provide lateral enlargements, which, when the teeth are driven home, clamp the plate to the wooden members. The teeth bear in like cross sectional slots in the plate to prevent relative lateral movement of the joined wooden members.

BACKGROUND OF THE INVENTION

The present invention relates to metal connector plates and structural wooden joints and more particularly to manually applied connector plates and their associated joints employed in wooden framing construction.

For many years, nails have been successfully used to join wooden structural load-bearing members. Applying overlying additional lumber to or toenailing butted wooden members are methods often utilized for joining wooden members, particularly in instances where it is impossible or very awkward to drive nails through one member into the other as in coplanar wooden members. In recent years, structural wooden joints have been developed which are connected solely by means of sheet metal plates having slender, elongated, nail-like teeth struck therefrom for embedment into adjoining wooden members, thereby eliminating the need for applying such additional overlying lumber or employing toenailing methods. A typical example of plates of this type is described and illustrated in U.S. Patents Nos. 2,877,520 and 3,305,252. Plates such as disclosed in the former patent have been successfully employed in the prefabrication of framing members, for example, large roof and floor trusses, and particularly lend themselves to the large scale prefabrication of such trusses and the like wherein the framing members are located on jigs and the plates embedded into the butted coplanar members by using large presses. The connector plates disclosed in the latter patent have been employed with success in joining angularly related surfaces, for example, corner joints. These connector plates have proven eminently successful and a significant advance over the time-tested hand-driven nail.

Such large scale prefabrication techniques as are often employed in joining coplanar members are, however, not practical or economical for the relatively smaller jobs, often performed by one or two carpenters or even by the so-called "do-it-yourself" handyman or carpenter. Also, the job, per se, may be of such character as to not be susceptible to large scale production and prefabrication techniques such as forming joints between angularly related members. Joints formed using one or more of connector plates disclosed in these patents are, however, extremely desirable, particularly in view of the high strength characteristics of the completed joints.

The planar connector plates employed in prefabricated wooden trusses are usually formed of heavy gauge sheet metal, such as 14 U.S. Standard gauge, and machine pressed into the wood. These plates, as well as the angle-type plates, are difficult to manually embed in the wooden members due to the relatively high insertion pressures required to drive a plurality of spaced teeth substantially simultaneously. The small jobber and the "do-it-yourself" carpenter or handyman, accordingly, have heretofore been unable to effectively realize the many advantages provided by connector plates of this type in jobs not practically and economicaly adapted to large scale prefabrication techniques.

SUMMARY OF THE INVENTION

The present invention provides a connector plate of the type having a plurality of slender, elongated, nail-like teeth struck therefrom to project integrally and normally from a side face of the plate, the sole connection between the plate and teeth prior to use being a slender strip of metal joining the pointed end portions of the teeth to the plate. In other words, the teeth are struck such that the head portions thereof are spaced from the plate and have no direct communication therewith other than through the shank and pointed end portions of the teeth. This type of tooth formation is in direct contrast to the tooth formation disclosed in the aforementioned patents wherein the teeth are struck such that the pointed ends are spaced from the plate with the head portions thereof lying substantially in the plate integrally therewith.

To embed the teeth of the present invention into the butting wooden members and secure the members together, the head portions of the teeth are hand-hammered in a direction to drive the teeth axially through the slots left in the plate by the struck teeth, thereby shearing the slender metal strip joining the pointed end portions of the teeth to the plate. The integral connection between the several teeth and the plate is severed and the teeth are free to be driven through the slots into the wood to final securement.

The teeth are further struck to provide lugs which project from opposite sides of the slots adjacent the pointed end portions thereof to serve as guides or ways to prevent twisting and canting of the teeth as the latter are driven through the slots to final securement. A V-shaped slot is also formed at the pointed end of the slot and the edges of the slots and the lugs together form a bearing for each tooth which prevents relative lateral movement of the plate relative to the teeth and hence separating movement of the joined wooden members. Laterally enlarged projections are formed on the head portions of the teeth and abut the outer face of the plate when the teeth are finally secured. These lateral projections preclude outward movement of the plate from the face of the wooden member and, in effect, clamp the plate to the wooden members.

The connector of the present invention can be rapidly applied to adjoining wooden structural members, with the members butting end to end in coplanar relation, in which case a flat connector plate would be employed or with the members butting in angular relation one to the other, i.e., corner joints, in which case a plate bent to a like angular relation would be employed. The present teeth can be more readily driven than a like number of nails in view of elimination of the nail starting steps normally required in conventional nailing. The rapidity and ease of application of the plate to the butted wooden structural members, the high strength characteristics of the joint thus formed, and other attendant advantages which accure to connector plates of the type having integrally struck teeth, such as described and illustrated in the aforementioned patents, and which also accrue to the present connector plate, provide the specialized jobber, the "do-it-yourself" carpenter and others with an eminently practical, economical and useful means for joining wooden structural members.

Accordingly, it is an object of the present invention to provide an improved connector plate for joining wooden structural members.

It is another object of the present invention to provide an improved connector plate for joining wooden structural members which can be easily, readily, and manually applied to wooden members.

It is still another object of the present invention to provide an improved connector plate for joining wooden structural members having a plurality of slender, elongated, nail-like teeth struck integrally therefrom which can be individually driven home upon application of the plate to the wooden members.

It is a further object of the present invention to provide an improved connector plate for joining wooden structural members having a plurality of slender, elongated teeth struck to project integrally therefrom which can be readily severed from the plate and rapidly driven through the plate to final securement.

It is still a further object of the present invention to provide an improved connector plate for joining coplanar wooden structural members and which can be manufactured at low cost.

It is still a further object of the present invention to provide an improved connector plate for joining angularly related wooden structural members.

It is yet a related object of the present invention to provide a wooden structural joint employing the foregoing improved connector plate.

It is still another related object of the present invention to provide a truss employing the foregoing improved connector plate.

These and further objects and advantages of the invention will become more apparent upon reference to the following specification, claims, and appended drawings, wherein:

DESCRIPTION OF THE DRAWING

FIGURE 1 is a fragmentary, longitudinal sectional view taken along line 1—1 of FIGURE 2 and illustrating a pair of wooden structural members joined by a connector plate constructed in accordance with the present invention with the teeth struck from the plate shown in various stages of embedment in the wooden members;

FIGURE 2 is a fragmentary top plan view thereof;

FIGURE 3 is a fragmentary perspective view of the connector plate illustrating one of the struck teeth prior to driving the same through the plate into one of the wooden members;

FIGURE 4 is an enlarged fragmentary sectional view illustrating the connection between the tooth and the plate prior to driving the tooth through the plate into the wooden member;

FIGURE 5 is a view similar to that of FIGURE 4 with portions broken away for ease of illustration and showing the tooth partially driven through the plate;

FIGURE 6 is a fragmentary view of the connector plate taken on line 6—6 of FIGURE 5 illustrating the tooth in engagement against the lugs in the guide slot;

FIGURE 7 is a perspective view of a connector plate constructed in accordance with the present invention for joining angularly related wooden structural members; and FIGURE 8 is a fragmentary end view of a joint formed employing the connector plate illustrated in FIGURE 7.

DESCRIPTION OF THE PREFERRED EMBODIMENT

Referring to the drawing and particularly to FIGURES 1 and 2, there is shown a pair of butting wooden structural load-bearing members designated 10 joined together by a connector plate 12 overlying the adjacent planar surfaces of one side of wooden members 10. It will be appreciated that a like connector plate can be applied to the opposite side of the wooden members thereby forming a joint employing two of the connector plates of the present invention. Plate 12 is formed of sheet metal, preferably 16 or 18 U.S. Standard gauge galvanized steel, having a plurality of elongated, slender, nail-like teeth 14 struck therefrom to project normally from a side face thereof, leaving a plurality of longitudinally extending rows of slots 16. Teeth 14 are struck such that head portions 18 thereof leave the end portions of the slots opposite the slot end portions from which the teeth project and, accordingly, head portions 18 are spaced outwardly from the plate.

The end portion of each tooth 14 is struck to form downwardly converging side edges 24 (FIGURE 3) which terminate at their lower ends in a narrow, slender strip of metal 26 integrally joining each tooth 14 to plate 12. Metal strips 26 provide the sole connection between the teeth 14 and plate 12 and form the weakened metal hinge about which teeth 14 are struck. Teeth 14 are struck as to be generally concave and V-shaped in cross section as best seen in FIGURE 6. Teeth 14 are struck such that head portions 18 include lateral projections 27 on the opposite side edges of each tooth forming a pair of underlying shoulders 28 which abut the outer surface of plate 12 when teeth 14 are finally secured as described hereinafter.

The teeth 14 in each longitudinal row, as best seen in FIGURE 2, are struck in an opposite direction from the teeth struck in the next adjacent longitudinal rows thereof, such that the slots in adjacent rows extend from the struck teeth in opposite directions. Additionally, the teeth are struck such that transversely adjacent slots 16 are longitudinally staggered whereby the laterally enlarged ends of the slots (those ends remote from the ends of the projecting teeth and left by enlarged head portions 18) lie in transverse alignment with the metal portions between the slots in the next adjacent rows thereof.

To form the joint, the planar side of plate 12 opposite the side thereof from which teeth 14 project, is applied against and spans the adjoining wooden members 10 as seen in FIGURE 1. The heads of each of the teeth may then be hand struck, as by a hammer, in a direction to drive the teeth axially through slot 16, thereby shearing the narrow metal strip 26 and severing the sole connection between teeth 14 and plate 12. The teeth are struck such that the quantity of metal forming the narrow strip 26 is insufficient to withstand the shear stress transmitted thereto along the longitudinal axis of the tooth by the striking action of the hammer. The bending operation by which the tooth is struck from the plate weakens the metal strip 26 and this, together with the minimum quantity of metal forming strip 26, permits the severance or shearing thereof by the application of an axial or hammering force to the tooth having a magnitude approximating the force required to start a conventional nail.

It is significant that by the foregoing unique location and formation of the shear strip 26, the sheared face S formed on the end of each tooth resulting from the shearing thereof from the plate in the aforesaid manner inclines at an angle which cooperates with the rear converging side edges 24 to form a generally V-shaped pointed end, generally indicated at 32, which is similar to the purposely formed pointed end of a conventional nail. Thus, the force required to drive teeth 14 into the wood corresponds favorably with and approximates the force required to drive conventional nails.

In order that teeth 14 may be guided as they are driven downwardly through slots 16 into wooden members 10 and to prevent separating movement of wooden members 10 as well as relative movement between teeth 14 and plate 12 when teeth 14 are finally secured, a pair of laterally inwardly projecting lugs 34 are formed on opposite sides of slots 16 adjacent the ends thereof from which teeth 14 project. It will be noted that rear edges 36 of lugs 34 are coincident with the edges 24 of teeth 14 prior to striking the latter from plate 12 and that metal is punched from plate 12 on opposite sides of metal strip 26 to form with lugs 34 a pair of through slots 33 defined by the forward edges 40 of lugs 34, side edges 42, and V-shaped slot end edges 44. These edges 40, 42 and 44 provide bearing surfaces within slots 16 against which, as seen in FIGURE 6, teeth 14 bear when driven into the wooden members and when finally secured. Teeth 14 are each driven home guided by this slot formation until finally secured with shoulders 28 butting the outer face of the plate clamping the plate to the wooden members 10. The bearing edges of the slot formation prevent relative movement between the teeth 14 and plate 12 whereby separating movement of members 10 is prevented.

As illustrated in FIGURES 7 and 8, the foregoing tooth formation may be employed in connector plates utilized in joining angularly related wooden members 50. In this form, a connector plate 52, formed of like sheet metal and provided with teeth 54 struck all in a similar manner as in the previous embodiment, is bent about a transverse axis to an angle corresponding to the angular relation of the wooden members 50. The planar faces of the bent plate portions 56 thus formed may then be applied against the inside end face portions of the butting angularly related members 50 and the teeth 54 driven home in such members in a like manner as previously described. In forming this corner plate, four longitudinal rows of teeth are struck as before with a minimum of two teeth in each row to provide at least one tooth in each longitudinal row in each plate portion 54. Preferably, the teeth in each row adjacent the bend axis of the plate are spaced one from the other twice the distance that the teeth in the previous form are spaced one from the other in order to provide clearance for the hammer when driving the teeth and to facilitate manufacture of the corner plate. In this manner, as illustrated in FIGURE 8, the head portions 58 of the teeth of one plate portion 56 are spaced outwardly of the head portions 58 of the other plate portion and this, together with the transverse staggered relation of the teeth, provides adequate clearance for the hammer. Moreover, if the outermost teeth 54 in each plate portion are first driven, still greater clearance is provided the hammer when the innermost teeth are driven. It will of course be appreciated that the teeth can be arranged in fewer longitudinal rows, for example, 2 or 3 rows, and that the teeth can be spaced closer to the bend axis of plate 52 as desired with care being taken to avoid the danger of the hammer interfering with teeth other than the tooth being driven.

The corner connector plate hereof can be bent in the opposite direction than that illustrated such that the plate can be applied to the outside of the corner joint. In this form, the planar surfaces of the plate would butt the respective outer faces of members 50 and the teeth 54 could readily be driven through plate 52 into the members 50 without the danger of the hammer interfering with the teeth on the opposite plate portions 56.

Preferably, the foregoing connector plates 12 and 50 are formed of 16 or 18 U.S. Standard gauge galvanized steel sheet metal having at least four longitudinal rows of teeth struck therefrom. Plate 12 preferably has four teeth in each row while plate 50 has at least two teeth in each row. It will be appreciated that a greater number of rows having additional teeth per row can be provided in each of the plates. A preferred spacing $b$ between the centerlines of teeth in adjacent rows is .45 inch and a preferred slot width C in the portion of the slot left by shank 29 is .20 inch. The preferred length of each tooth is 1.0 inch, and the length of the slot $d$ left by projections 27 is .13 inch. The distance $f$ between adjacent teeth in plate 12 in the same longitudinal row from centerline to centerline is 1.62 inches, while the distance between teeth 54 in the same row and measured along both plate portions 56 is 3.24 inches. The apparent minimum net section $e$ between slots in adjacent rows is .13 inch, while the effective net section between adjacent slots is .25 inch which corresponds to the actual transverse distance between adjacent edges of the slots left by shank portions 20. The ratio of the actual to the apparent net section is therefore .25/.13 or approximately twice as great. These dimensional relationships result in an unexpectedly high effective net section thereby providing a plate 12 having an unexpectedly high tensile strength.

It thus seen that the objects of my invention have been accomplished in that there has been provided a connector plate having integrally struck teeth, each of which can be manually driven into adjoining wooden members without positioning, steadying or holding the teeth and in considerably less time than a like number of nails could be driven into the wooden members. The slots are formed to provide ways or bearing surfaces which guide the teeth as they are driven through the plate and provide abutment surfaces against which the teeth bear to prevent separating movement of the joined wooden members. Moreover, the connector plate is readily adapted for use by a "do-it-yourself" carpenter, has high strength characteristics, and can be manufactured at low cost.

The invention may be embodied in other specific forms without departing from the spirit or essential characteristics thereof. The present embodiments are therefore to be considered in all respects as illustrative and not restrictive.

What is claimed and desired to be secured by United States Letters Patent is:

1. A connector plate for joining adjacent wooden structural members comprising a sheet metal plate having a plurality of elongated, nail-like teeth struck therefrom, leaving a plurality of slots in the plate, said teeth projecting outwardly from one side of the plate with the head portions thereof spaced from said plate, each of said teeth having a pointed end portion, said pointed end portions being integrally joined to said plate by narrow strips of plate metal bent to form the hinge axes about which said teeth are struck, said metal strips being severable in response to forces applied to the head portions of said teeth for driving said teeth through their associated slots for embedment into the adjoining wooden structural members, said teeth including means for retaining said plate against the structural members, said teeth being engageable against edge portions of said slots when driven to final securement to prevent relative lateral movement of the plate and teeth.

2. A connector plate according to claim 1 wherein said slot edge portions include a pair of lugs projecting laterally into said slots from opposite sides thereof, said lugs being spaced from the ends of said slot a distance at least equal to the thickness of said plate whereby said driven teeth engage against said lugs and the ends of the slots.

3. A connector plate according to claim 2 wherein said teeth are generally V-shape in cross section, said plate being struck as to form a corresponding V-shape slot adjacent the end of the slot from which the pointed end portion of each tooth is struck, the edges of said lugs defining a side portion of said V-shaped slot.

4. A connector plate according to claim 1 wherein each of said teeth are generally V-shape in cross section, the lower side edges of each of said teeth converging toward one another to form lateral portions of said pointed end portions, said metal strip being severable to form an angled tooth shear face comprising the tip of said pointed end portion.

5. A connector plate according to claim 1 wherein said teeth are arranged in a plurality of spaced longitudinally extending rows, the teeth in each row being struck in opposite directions to the teeth struck in the next adjacent rows such that the slots left thereby in each row extend from the teeth in the opposite direction from the direction that the slots of the next adjacent rows extends from their teeth, said longitudinal rows extending in staggered relation, said engaging means including a pair of lateral projections extending integrally from opposite side edges of each of said teeth adjacent the head portions thereof and forming underlying shoulders for abutting said plate when finally secured, the enlarged lateral portions of said slots left from the struck lateral projections of said teeth being opposite the metal portions of the plate between adjacent slots in the next adjacent rows whereby the effective net section is preserved.

6. A connector plate according to claim 5 wherein said teeth are generally V-shaped in cross section and said slot edge portions include a pair of lugs projecting laterally into said slots from opposite sides thereof, said lugs being spaced from the ends of said slots a distance at least equal to the thickness of said plate, the end portions of said slots from which said teeth project being formed to provide with said lugs substantially V-shaped openings for receiving said V-shaped teeth, the lower side edges of each of said teeth converging toward one another to form lateral portions of said pointed end portions, said metal strip being severed to form an angled tooth shear face comprising the tip of said pointed end portion.

7. A connector plate according to claim 1 wherein each of said strips of metal form a continuation of said teeth centrally between the side edges of the teeth.

8. A structural truss comprising a plurality of coplanar load bearing members butting one another to form a plurality of joints, each of said joints including at least one sheet metal connector plate having a plurality of elongated, nail-like teeth struck therefrom leaving a plurality of slots in the plate, said teeth projecting outwardly from one side of the plate, each of said teeth having a pointed end portion integrally joined to said plate by a narrow strip of metal bent to form the hinge axis about which each tooth is struck, said metal strip being severable in response to a force applied to the head portion of said tooth driving said tooth through said slot into said adjoining butting members embedding said tooth therein, edge portions of said slots being adapted to provide surfaces against which said driven teeth bear to prevent lateral movement of said plate relative to said teeth, said teeth including means for retaining said plate against the butted wooden members.

9. A connector plate for joining adjacent wooden structural members comprising a sheet metal plate having a plurality of elongated, nail-like teeth struck therefrom leaving a plurality of slots in the plate, each of said teeth having a pointed end portion and a head portion, said teeth projecting outwardly from one side of the plate with the head portions thereof spaced from said plate, said teeth being integrally joined to said plate at locations axially spaced from said head portions by narrow strips of metal bent to form the hinge axes about which said teeth are struck, said metal strips being severable in response to forces applied to the head portions of said teeth for driving said teeth through the associated slots for embedment into the adjoining wooden structural members, said teeth including means for retaining said plate against the structural members.

10. A connector plate according to claim 9 wherein said teeth are arranged in a plurality of spaced longitudinally extending rows, the teeth in each row being struck in opposite directions to the teeth struck in the next adjacent rows such that the slots left thereby in each row extend from the teeth in a direction opposite from the direction that the slots of next adjacent rows extend from their teeth.

11. A connector plate according to claim 9 wherein said retaining means includes at least one lateral projection formed on each of said teeth and spaced from the pointed end portion thereof, the width of each of said teeth and its lateral projection being greater than the width of said slots whereby said projections abut said one side of said plate when said teeth are finally embedded.

12. A connector plate according to claim 9 wherein said teeth are generally concave in cross section and said retaining means includes a pair of lateral projections extending integrally from opposite side edges of each of said teeth and forming shoulders for abutting said one plate side when finally secured.

13. A connector plate according to claim 9 in combination with a pair of butted coplanar wooden structural members, said plate being located to span the butted portions of said members with the other side of said plate being placed against the coplanar surfaces of said wooden members, said teeth being driven into said butted members to secure the same in butted relation.

14. A connector plate according to claim 9 wherein said teeth lie wholly on said one side of said plate.

15. A connector plate according to claim 9, wherein said teeth and said plate comprise discrete, non-integrally connected members when said metal strips are severed.

16. A connector plate for joining angularly related wooden structural members comprising a sheet metal plate bent to form a pair of flat angularly related plate portions, a plurality of elongated, nail-like teeth struck from said plate in each said plate portions leaving a plurality of slots therein, said teeth having pointed end portions and head portions, said teeth projecting outwardly from a side face of each said plate portion with the head portions of the teeth being spaced from the associated plate portion, said teeth being integrally joined to the associated plate portions at locations axially spaced from said head portions by narrow strips of metal bent to form the hinge axes about which the teeth are struck, said metal strips being severable in response to forces applied to the head portions of said teeth driving said teeth through their associated slots for embedment into the angularly related wooden structural members, said teeth including means for retaining said plate against the wooden members.

17. A connector plate according to claim 16 wherein said teeth project from the same side face of said plate.

18. A connector plate according to claim 16 wherein said teeth project outwardly from the plate portions having faces forming an angle of less than 180 degrees.

19. A connector plate for joining adjacent wooden structural members comprising a plate formed of sheet metal material, said plate having a plurality of teeth struck therefrom leaving a plurality of slots in said plate, said teeth projecting outwardly from one side of said plate with the other side of said plate forming a planar surface free of protuberances, said teeth including head portions spaced from said plate and end portions for initially penetrating the wooden members upon embedment of the teeth therein, means comprised of plate material integrally connecting said teeth and said plate at locations axially spaced from said head portions, said connecting means being severable in response to forces applied to the head portions of said teeth for driving said teeth through their associated slots for embedment into the adjoining wooden structural members, said teeth including means engageable against said one plate side when said teeth are finally imbedded to retain said plate against the structural members.

20. A connector plate according to claim 19 including means cooperating between said plate and said teeth when said teeth are finally embedded to preclude relative lateral movement between said plate and teeth.

21. A connector plate according to claim 19 wherein said teeth and said plate comprise discrete, non-integrally connected members when said connecting means are severed.

22. A connector plate according to claim 19 wherein said connecting means comprises metal strips integrally connecting the end portions of said teeth and said plate, said teeth projecting outwardly from and substantially normal to said one plate side.

23. A connector plate according to claim 19 wherein said teeth extend substantially normal to said plate with said head portions and end portions lying on a common axis through said teeth, said teeth being bent about said axes to provide generally convex and concave surfaces on opposite sides of said teeth.

References Cited

UNITED STATES PATENTS

| | | | |
|---|---|---|---|
| 3,279,014 | 10/1966 | Fischer | 24—123 X |
| 3,016,586 | 1/1962 | Atkins | 85—13 X |
| 3,090,088 | 5/1963 | Foley et al. | 85—13 X |
| 3,322,017 | 5/1967 | Dufficy | 85—13 |

FOREIGN PATENTS

| | | |
|---|---|---|
| 485,193 | 7/1952 | Canada. |
| 569,004 | 7/1958 | Belgium. |

RAMON S. BRITTS, Primary Examiner

U.S. Cl. X.R.

287—20.92